(12) United States Patent
Clapp

(10) Patent No.: US 8,474,589 B2
(45) Date of Patent: Jul. 2, 2013

(54) COMPACT UNIVERSAL FLUID-ACTUATED CLUTCH

(75) Inventor: Timothy A. Clapp, Sharon Center, OH (US)

(73) Assignee: EBO Group, Inc., Sharon Center, OH (US)

( * ) Notice: Subject to any disclaimer, the term of this patent is extended or adjusted under 35 U.S.C. 154(b) by 365 days.

(21) Appl. No.: 12/844,237

(22) Filed: Jul. 27, 2010

(65) Prior Publication Data

US 2012/0024655 A1 Feb. 2, 2012

(51) Int. Cl.
*F16D 25/08* (2006.01)

(52) U.S. Cl.
USPC ............ 192/85.49; 192/18 A; 192/85.61; 192/110 B; 192/113.34; 192/113.5

(58) Field of Classification Search
USPC .............. 384/571; 192/18 A, 12 C, 85.49, 192/85.61, 113.35, 113.34, 113.5
See application file for complete search history.

(56) References Cited

U.S. PATENT DOCUMENTS

| | | | | |
|---|---|---|---|---|
| 1,949,824 A | * | 3/1934 | Buckwalter | 384/571 |
| 3,605,963 A | * | 9/1971 | Roob et al. | 192/18 A |
| 3,860,100 A | * | 1/1975 | Spanke et al. | 192/18 A |
| 4,838,841 A | * | 6/1989 | Harvey | 474/190 |
| 6,374,976 B1 | * | 4/2002 | Alberni et al. | 192/85.53 |
| 6,428,012 B1 | * | 8/2002 | Amaral et al. | 277/372 |
| 6,648,117 B2 | * | 11/2003 | Shoji et al. | 192/55.61 |
| 7,287,634 B2 | * | 10/2007 | Agner et al. | 192/48.603 |
| 7,497,312 B2 | * | 3/2009 | Braford, Jr. | 192/48.603 |

* cited by examiner

*Primary Examiner* — Rodney Bonck
*Assistant Examiner* — Lillian Nguyen
(74) *Attorney, Agent, or Firm* — Renner, Kenner, Greive, Taylor, Bobak & Weber Co., L.P.A.

(57) ABSTRACT

A compact universal fluid-actuated clutch employs a pair of tapered roller bearings between a cover plate and output shaft, the roller bearings serving to not only rotationally maintain the output shaft, but receive and transfer clutch reactionary forces therethrough. Lubrication to the tapered roller bearings serves to lubricate not only a thrust bearing through which the actuation forces are transferred, but also to lubricate the clutch, as well, in the embodiment of a wet clutch. Also provided is an output shaft brake assembly, which is also lubricated through the tapered roller bearings, and which is of a small compact nature, consisting of a piston rotatably secured to the end cover, and a rotor operatively attached to the output shaft. The invention substantially eliminates the need for rotary unions and rifle boring of the output shaft, and allows for adaptation of the shaft to direct or belt drive equipment connections.

8 Claims, 8 Drawing Sheets

COMPACT UNIVERSAL FLUID-ACTUATED CLUTCH

TECHNICAL FIELD

The invention herein resides is in the art of power transmission devices and, more particularly, to fluid-actuated clutch assemblies. Particularly, the invention relates to a fluid-actuated clutch of reduced length, and which can be universally used in either direct drive or belt drive applications, while eliminating the space and cost of through-shaft oil flow in a wet clutch adaptation. More particularly, the invention relates to a fluid-actuated clutch assembly adapted for both wet and dry clutch applications, and which is characterized by reduced manufacturing costs and reduced size, without compromising efficiency or effectiveness in operation.

BACKGROUND OF THE INVENTION

As internal combustion engines have advanced with fuel injection systems and the like, their power density has increased, providing more horsepower with smaller size engine blocks, shafts, and bearings. This has put increased burdens on the clutches that must start up and connect the engines to the driven load. Moreover, clutches must often absorb more energy in starting large loads.

The traditional flywheel-mounted pilot bearings that have helped support the clutch output shaft have proven problematic to engine life as the reaction loads exceed the capacity of the engine bearings. There is a need to provide engine clutches with output shafts that are independent of the engine bearings. In addition, there is a need for an engine clutch that is axially short to minimize the overall length of the drive system. Thus, the extra length necessary to accommodate a double bearing-supported output shaft necessitates improved clutch architecture to maintain or reduce the overall length.

It is now commonplace for manufacturers of engine powered equipment to use the same engine for multiple applications, some of which are directly coupled to the driven equipment, while others are belt driven. Prior art clutches have required different shaft bearing arrangements for direct and belt drives, thus requiring the equipment manufacture to stock and support two different clutch models. There is a need for engine clutches to be designed with a bearing arrangement that can provide long, trouble-free life in both direct coupled and belt drive applications.

Previously known fluid-actuated engine clutches have been typically offered in three piston configurations. The first includes rotary piston designs with rotary unions at the output shaft end. These clutches require rifle drilled shafts, and the rotary unions add length and complexity. Moreover, such configurations are not adaptable to direct drive applications. Rotary piston designs with rotary seals that fit around the shaft have also been provided. Again, these designs require rifle drilling of the shafts. Moreover, the seals are expensive, especially in larger diameter shafts, and they add considerable length to the overall assembly. Finally, stationary piston clutches have been provided with separate bearings to transfer the thrust loads from the piston to the clutch and to restrain the reaction loads. Typically, the output shaft in these designs used two bearings, for a total of four bearings and considerable axial length. In the past, large hydraulically actuated engine clutches have often used oil cooling of the friction disk pack to extend life, especially where high energy start-up is required. This oil flow can also extend the life of the bearings. Prior art clutches commonly required oil flow through the shaft in order for the oil to effectively reach the friction disks and bearings. This again added to overall length, size, and cost of manufacture.

Finally, previously known fluid-actuated clutch assemblies, particularly those operating with high inertia equipment, such as tub grinders, horizontal grinders, rock crushers and the like, have been shown to be more efficient and safe when an output shaft brake is included with the clutch. However, in the past such output shaft brakes have been complex, expensive, and given to increasing the overall size of the clutch with which it is used.

DISCLOSURE OF INVENTION

In light of the foregoing, it is a first aspect of the invention to provide a compact universal fluid-actuated clutch having an output shaft that is independent of the drive engine bearings.

Another aspect of the invention is the provision of a compact universal fluid-actuated clutch that is axially shorter than those of the prior art, minimizing the overall length of an associated drive system.

Yet another aspect of the invention is the provision of a compact universal fluid-actuated clutch that eliminates the prior need of a double bearing supported output shaft.

Still a further aspect of the invention is the provision of a compact universal fluid-actuated clutch that is readily adaptable for implementation with both direct and belt drive equipment.

Still a further aspect of the invention is the provision of a compact universal fluid-actuated clutch with a bearing arrangement that can provide long, trouble-free life in both direct coupled and belt drive applications.

An additional aspect of the invention is the provision of a compact universal fluid-actuated clutch that eliminates the necessity of rotary unions at output shaft ends, rifle drilled shafts, rotary seals, and separate bearings to transfer the thrust loads from the piston to the clutch and restrain reaction loads.

Yet a further aspect of the invention is the provision of a compact universal fluid-actuated clutch that employs oil cooling of the friction disk pack, and that does so by providing a unique oil flow from the clutch end cover to cool the bearings and clutch disks without rifle drilling the shaft.

An additional aspect of the invention is the provision of a compact universal fluid-actuated clutch in which a brake disk is integrated into an end of the clutch cover and which is both compact and low cost, while locking and inhibiting undesired rotation of the output shaft.

The foregoing aspects of the invention are attained by the structure described and claimed herein, in which a fluid-actuated clutch combines the fluid actuator with the clutch end cover. A thrust bearing allows a piston to provide the desired axial force to the clutch pressure plate. A pair of tapered roller bearings support the shaft and are sized such that the outboard tapered roller bearing also takes the reaction load from the clutch actuation. This eliminates the need for an additional thrust bearing and shortens the length of the clutch assembly. The tapered roller bearings are precisely located with spacer rings clamped between the outer races and the inner races to provide clearances that allow these bearings to operate with direct and indirect drives. According to the invention presented herein, a unique oil flow path is provided from the clutch end cover to cool the bearings and the clutch disks and to also cool a brake disk that is integrated into the end cover.

Specifically, certain aspects of the invention are attained by a fluid actuated clutch, comprising: a clutch housing; an output shaft extending from an end of said clutch housing; shaft support bearings interposed between said output shaft and clutch housing in both axial and radial restraining engagement; a friction pack interposed between a back plate and pressure plate and operatively connected to said output shaft; a fluid actuated piston received by and operative within said clutch housing; a thrust bearing interposed between said piston and said pressure plate; and wherein reaction thrust loads from said back plate are restrained by said clutch housing through said output shaft and at least one of said shaft support bearings.

DESCRIPTION OF DRAWINGS

For a complete understanding of the various aspects, techniques and structures of the invention, reference should be made to the following detailed description and accompanying drawings wherein.

DETAILED DESCRIPTION OF PREFERRED EMBODIMENT

Figure 1:
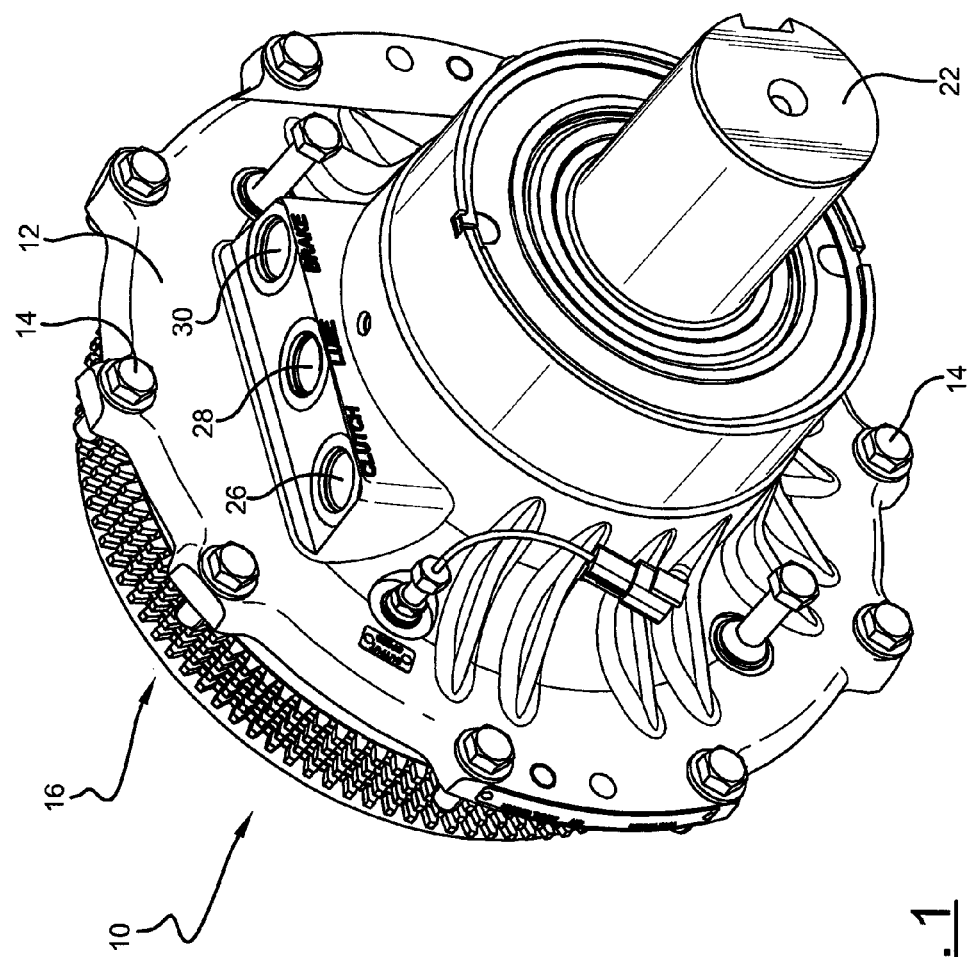
FIG. 1 is perspective view of the compact universal fluid-actuated clutch of the invention.
Figure 2:
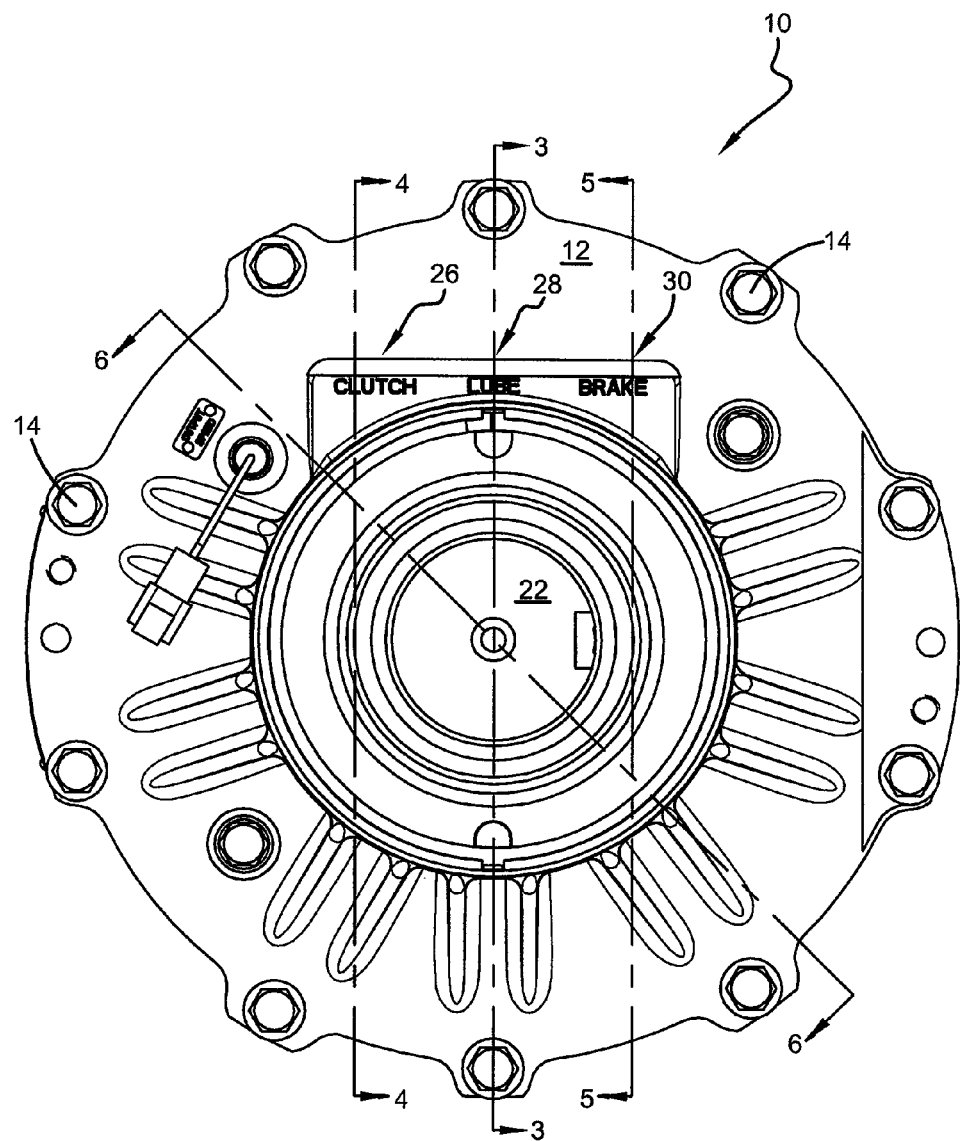
FIG. 2 is a front elevational view of the clutch of FIG. 1.
Figure 3:
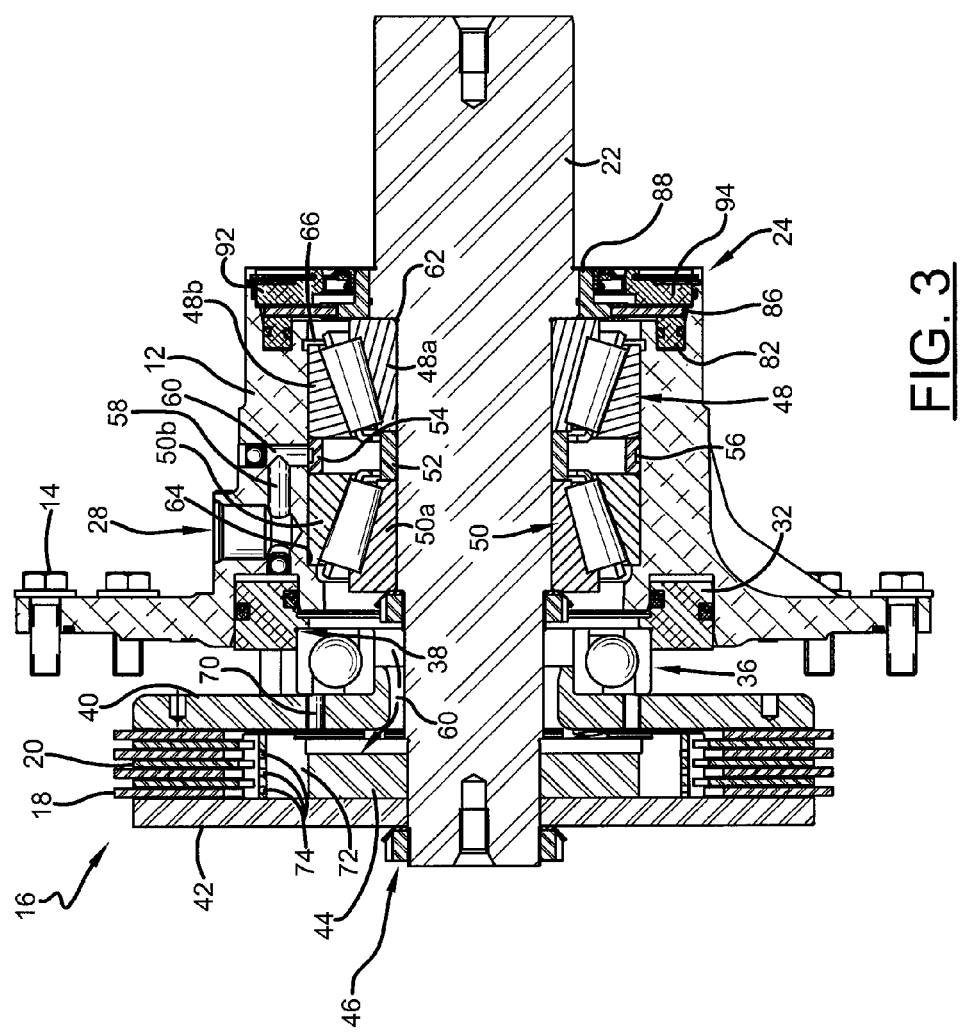
FIG. 3 is a cross sectional view of the clutch of FIG. 1, taken along the line 3-3 in FIG. 2, and showing the primary structural features of the invention.

Referring now to the drawings and more particularly FIGS. 1, 2, and 3, it can be seen that a compact universal fluid-actuated clutch made in accordance with the invention is designated generally by the numeral 10. The clutch 10 includes a housing or end cover 12 adapted to be fixed to the housing of a power input source such as a motor or engine, by means of circumferentially spaced bolts 14. Included as part and parcel of the clutch 10 is a friction pack assembly 16 (shown in FIG. 3) consisting of alternatingly interleaved separator disks 18 and friction disks 20. Such friction packs are well known and understood by those skilled in the art. In the embodiment shown, the separator disks 18 are operatively splined to the input power source such as a motor or engine (not shown), while the friction disks 20 are operatively keyed or otherwise connected to an output shaft 22. The output shaft 22 is operatively connected, by direct couple, belt drive, or the like to an appropriate piece of driven equipment, as known in the art. Operatively interposed between the end cover 12 and output shaft 22 is a brake assembly 24, provided to prevent rotation of the shaft 22 when the friction pack 16 is disengaged. Those skilled in the art will appreciate that, particularly in wet clutch assemblies, the viscous nature of the clutch fluid may often be thick enough in cold weather to allow for effective interengagement between the separator and friction disks 18, 20, even when the clutch is disengaged. As will become apparent below, the brake assembly 24 serves to prevent such inadvertent and undesired rotation of the shaft 22.

As shown in FIGS. 1 and 2, three hydraulic inputs are provided to the clutch assembly 10, the first being a hydraulic clutch control input 26, the second a lubrication input 28, and a third the brake control input 30. As will be appreciated by those skilled in the art, the application and regulation of the hydraulic inputs are under operator or programmed control.

Figure 4:
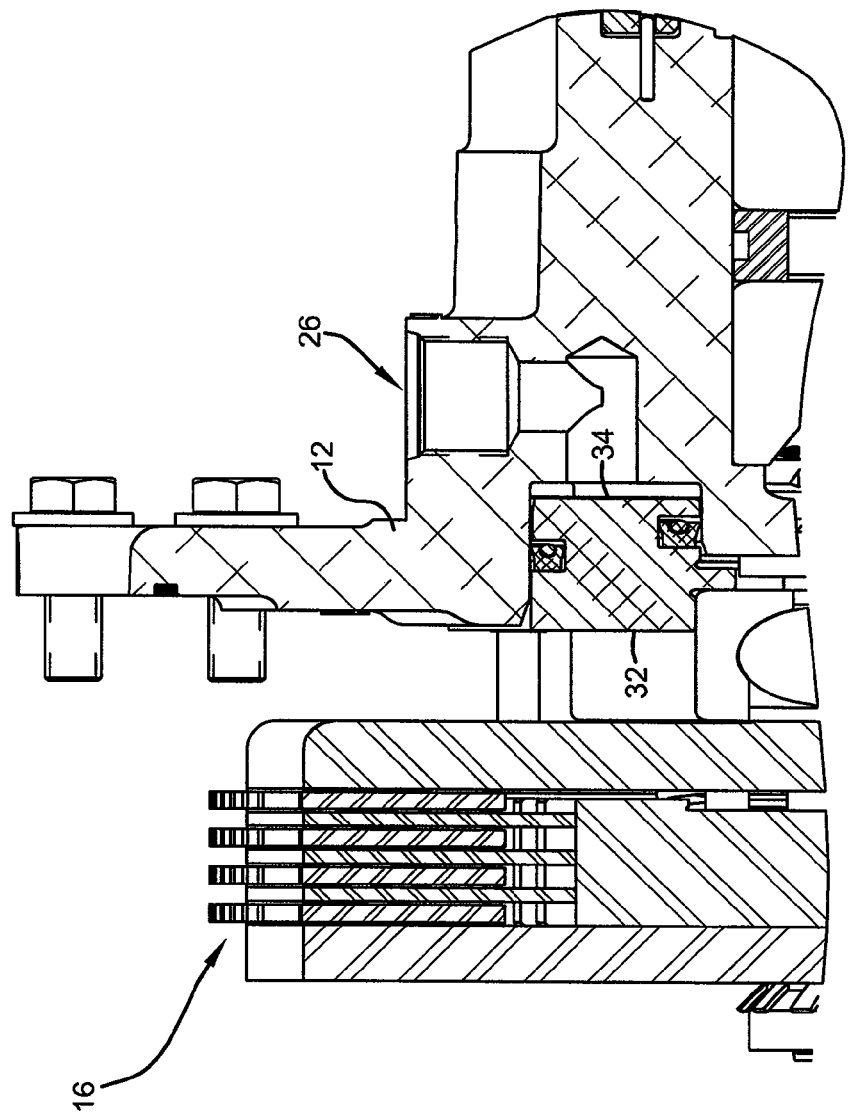
FIG. 4 is a partial cross sectional view of the clutch of FIG. 1, taken along the line 4-4 in FIG. 2, and showing the clutch actuation structure of the invention.

With particular reference to FIGS. 3 and 4, it can be seen that actuation of the friction pack 16 is under control of an annular clutch piston 32 received within a clutch cavity 34 machined within the housing end cover 12. Hydraulic pressure introduced though the input 26 creates a pressure head within the cavity 34, which operates upon the piston 32, driving it to the left as shown in FIGS. 3 and 4.

A thrust bearing assembly 36 is driven by the piston 32 by ring shoulder engagement between the two as shown at 38. While various thrust bearings might be employed for this purpose, an angular contact bearing is presently contemplated. The thrust bearing 36 is annularly received by the pressure plate 40 which, in response to force imparted thereto by the thrust bearing 36, engages the alternatingly interleaved separator disks 18 and friction disks 20 of the friction pack 16, in known fashion. The force of the pressure plate 40 through the friction pack 16 is resisted by a back plate 42, which is keyed to the output shaft 22.

An output hub 44 is keyed to the output shaft 22 about an inside diameter thereof, and to the friction disks 20 about the outside diameter thereof. As presented earlier, the separator disks 18 are splined to the input power source of a motor, engine or the like. A lock nut and washer assembly 46 axially secures and limits movement of the back plate 42 in standard fashion.

A particularly novel aspect of the instant invention is the utilization of a pair of tapered roller bearings 48, 50 to mount the output shaft 22. As shown, the tapered roller bearing 48 has an inner race 48a and outer race 48b, while the tapered roller bearing 50 similarly has an inner race 50a and outer race 50b. A ring-like inner spacer 52 is interposed between the inner races 48a, 50a, while a grooved annular outer spacer 54 is interposed between the outer races 48b, 50b. An annular lubrication groove 56 encircles the outside circumference of the outer spacer 54 for purposed of receiving lubricant through the lubrication input 28 and through the normally intersecting bores 58, 60. As shown, the bores 58, 60 are pressure plugged following manufacture.

A retaining shoulder 62 is provided about the output shaft 22 for abutting the inner race 48a of the tapered roller bearing 48. Similarly, a retaining shoulder 64 is provided about and within the end cover 12 in abutting engagement with the outer race 50b of the tapered roller bearing 50. An annular wave spring 66 is interposed between the end cover 12 and outer race 48b to urge the bearing 48 against the spacer 54 and bearing 50 for proper positioning.

A lubricating oil path is defined from the lubrication input 28, through the intersecting bores 58, 60, lubrication groove 56, and through the tapered roller bearing assembly 48, 50. The lubrication path through the tapered roller bearing 50 passes through the thrust bearing assembly 36, lubricating the same, and then takes paths leading to the friction pack 16, for implementation in a wet clutch embodiment. A first such path is shown by the dashed line 68, passing from the thrust bearing assembly 36 and about an inner diameter clearance between the pressure plate 40 and output shaft 22 and then into the area of the friction pack 16. A second path passes from the thrust bearing 36, through bores 70 in the pressure plate 40 and into cavities 72 within the output hub 44 which is splined to the friction disk 20. As shown, bores 74 extend radially from the cavities 72 to the area of the disks 18, 20 of the friction stack 16 for lubrication and cooling purposes.

At present, it should be appreciated that the clutch of the invention combines the fluid actuator with the clutch end cover 12. The thrust bearing 36 allows the piston 32 to provide the desired axial force to the clutch pressure plate 40. The pair of tapered roller bearings 48, 50 support the output shaft 22 and are sized such that the tapered roller bearings take the reaction load from clutch actuation. This reaction load passes though the shaft 22 and to the roller bearing 48 at the retaining shoulder 62, though the spacers 52, 54, and thence through the tapered roller bearing 50 to the retaining shoulder 64 of the end cover 12. This structure eliminates the need for additional thrust bearings as previously required, and allows for shortened length of the clutch assembly from those previously known. With the tapered roller bearings 48, 50 being precisely located with the spacer rings 52, 54 clamped therebetween, proper clearances may be achieved to allow these bearings to operate with both direct and indirect drives.

Figure 3A:
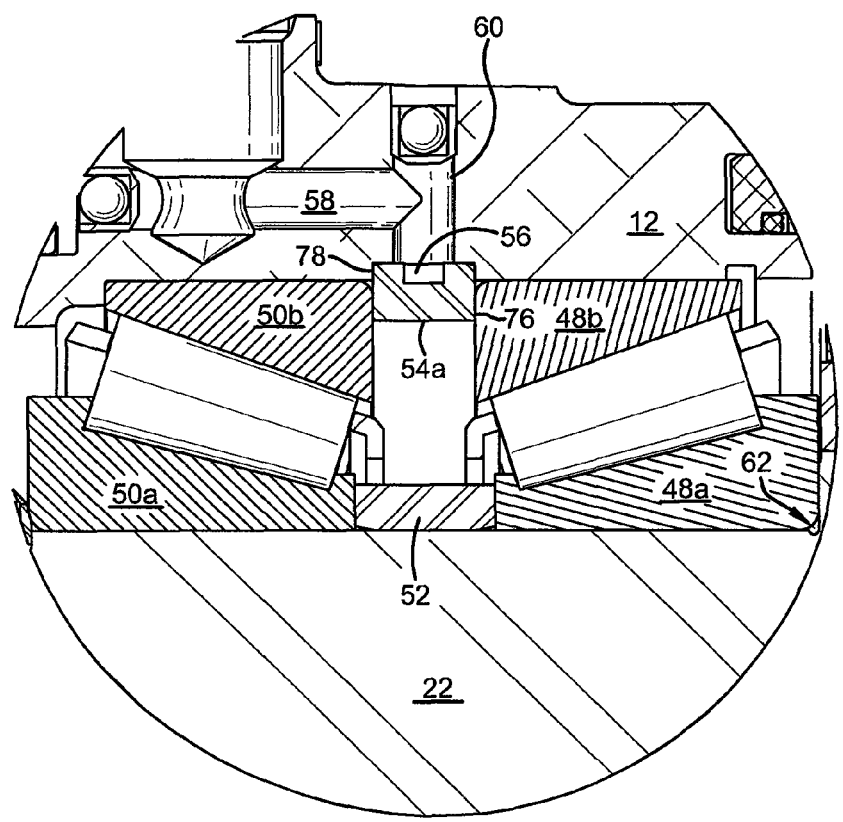
FIG. 3A is a partial cross sectional view of the clutch of FIG. 1, taken along the line 3-3 in FIG. 2, and showing a first alternative arrangement of the roller bearings and their loading.
Figure 3B:
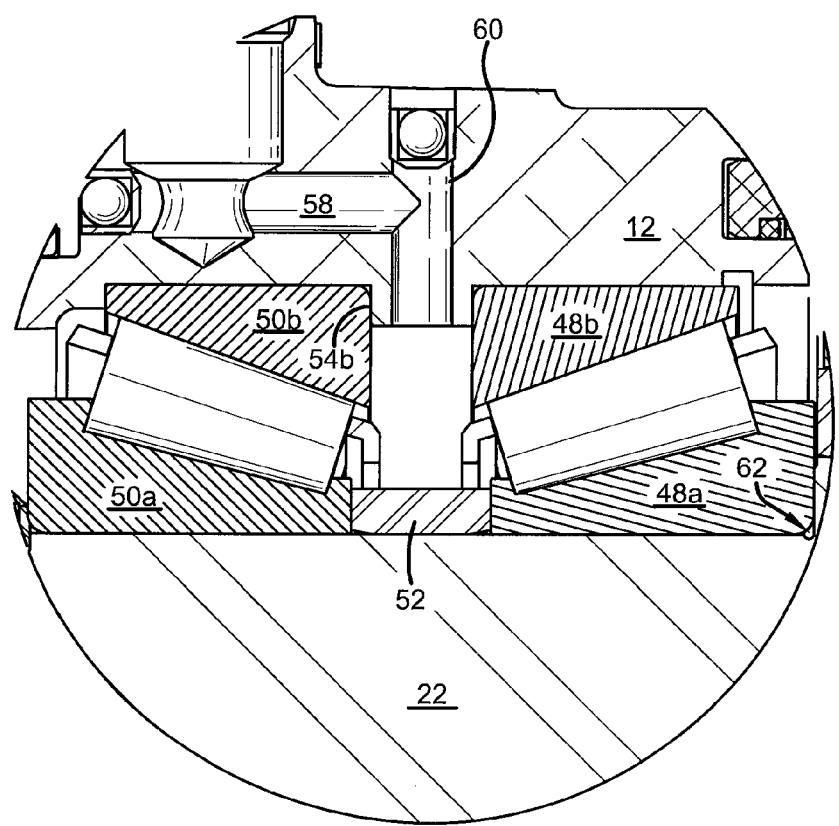
FIG. 3B is a partial cross sectional view of the clutch of FIG. 1, taken along the line 3-3 in FIG. 2, and showing a second alternative arrangement of the roller bearings and their loading.

Alternative means for spacing and loading the tapered roller bearings 48, 50 are shown in FIGS. 3A and 3B. In FIG. 3A, the outer spacer ring 54a is a split ring spacer inset within an annular groove in the clutch housing or end cover 12. In such embodiment, the reaction load passes through the shaft 22 and to the roller bearing 48 at the retaining shoulder 62. The force or load then passes through the inner race 48a and outer race 48b, and thence through the shoulder 76 and to the split ring spacer insert 54a. Finally, the force passes through the shoulder 78 and to the end cover 12.

In the embodiment of FIG. 3B, an annular rib 54b is formed integrally from the clutch housing or end cover 12, and in communication with the lubrication and coolant bores 58, 60. Here, the reaction load passes through the shaft 22 and to the roller bearing 48 at the retaining shoulder 62. The force or load then passes through the outer race 48a and inner race 48b, and thence to the annular rib 54b, which is part and parcel of the end cover 12.

Thus, there are presented fluid actuated clutches with integral shaft and shaft support bearings with a stationary fluid actuated piston in the end cover acting through a single thrust bearing into the pressure plate of the clutch, through the disk stack, and with the reaction thrust loads from the back plate of the clutch being restrained by one or more shaft support bearings. The flow of lubricant through the thrust tapered roller bearings 48, 50, as well as the thrust bearing 36 allows for the removal of heat, reduction of friction, and extended bearing life.

In the structures just presented, it can also be appreciated that, in wet clutch embodiments, cooling of the friction disk pack may be employed to extend the life thereof. This is particularly desirable where high energy start-up is required. While previously known clutches required oil flow through the shaft in order for the oil to effectively reach the friction disks and bearings, the structure just described provides a unique oil flow from the clutch end cover, beginning at the lubricant input 28, to cool not only the bearings but the clutch disks as well, without rifle drilling the shaft. As will become apparent below, this flow also serves to cool the brake disk, as well.

Figure 5:
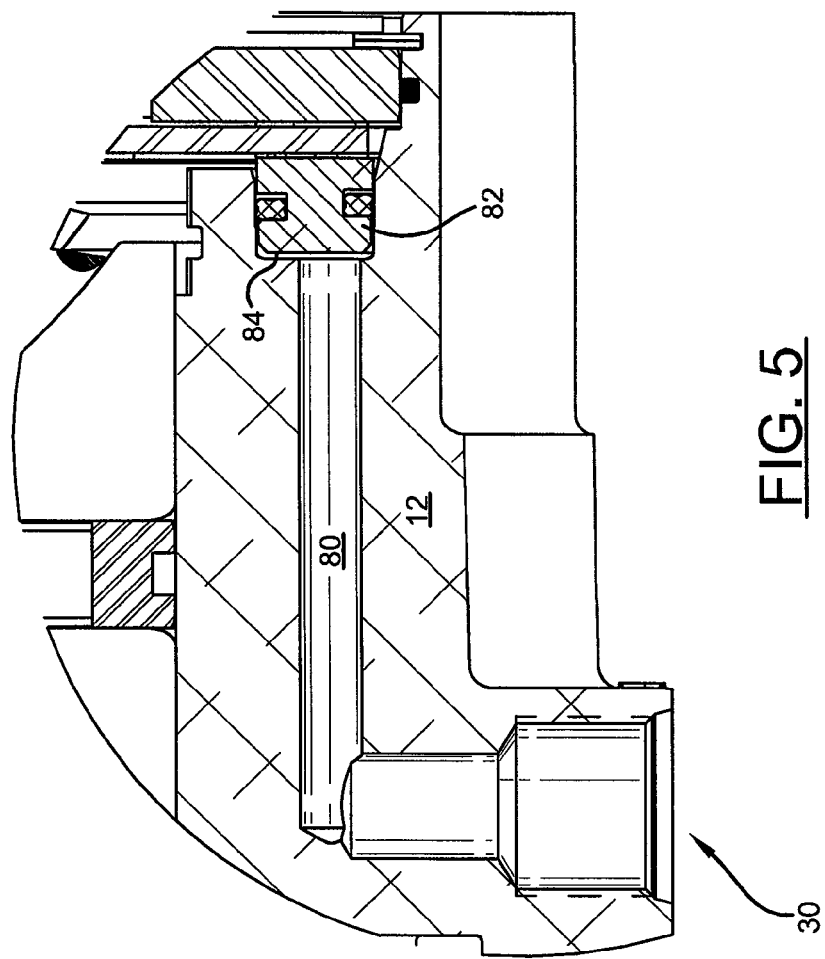
FIG. 5 is a partial cross sectional view of the clutch of FIG. 1, taken along the line 5-5 of FIG. 2, and showing the brake actuation feature of the invention.
Figure 6:
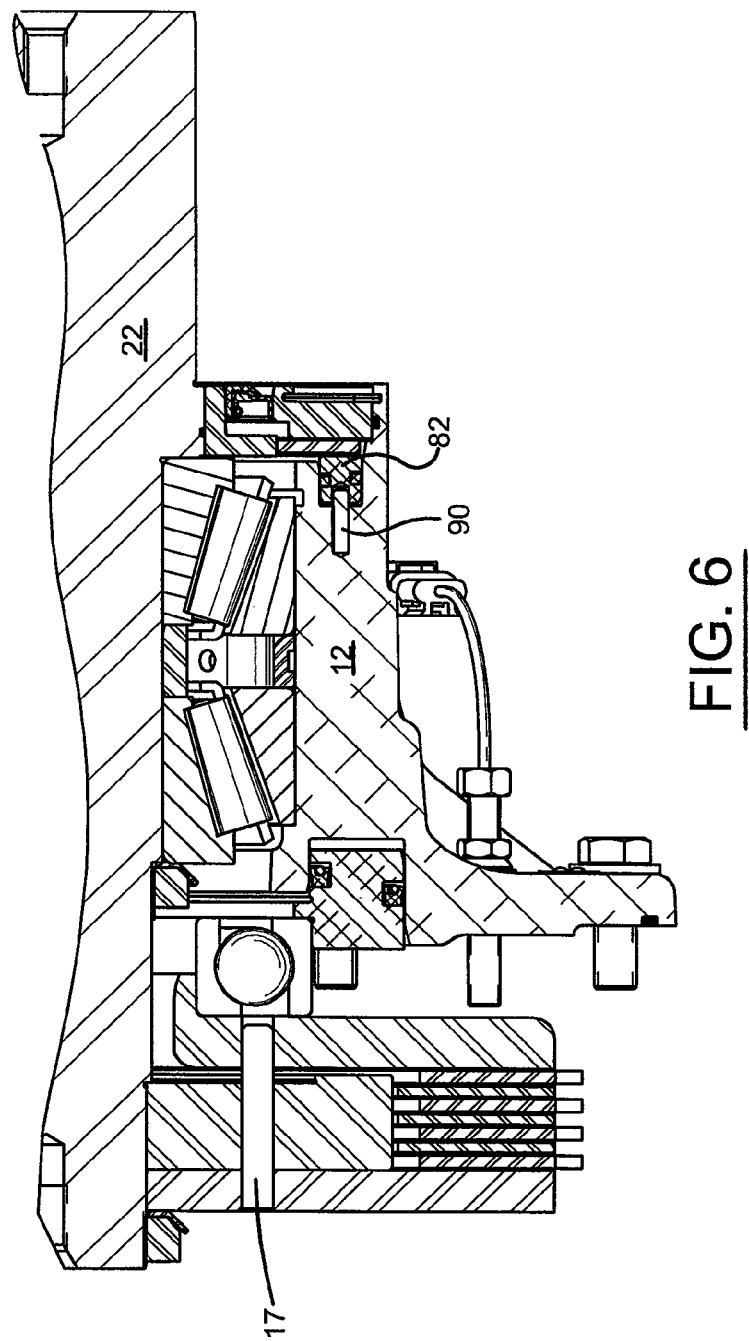
FIG. 6 is a partial cross sectional view of the clutch of FIG. 1, taken along the line 6-6 in FIG. 2, and showing the brake piston being fixedly pinned to the end cover assembly.

With reference now to FIGS. 3, 5, and 6 an appreciation can be obtained regarding the structure and operation of the output shaft brake assembly 24. As shown in FIG. 5, an axial bore 80 interconnects the hydraulic brake input 30 with an annular piston 82 received within an annular piston cavity 84, allowing for the development of a pressure head therebetween. A brake rotor 86 is rotationally keyed or otherwise fixed to the output shaft 22. In a preferred embodiment, this interconnection is through a seal ring 88 affixed to the shaft 22.

As best shown in FIG. 6, dowel pins 90 may provide interengagement between the end cover 12 and annular piston 82 to rotationally secure the two together. A notched seal cover 92 may be provided for secure engagement to the end cover 12 by means of torque reaction tabs 94.

A lubricant flow path for the brake assembly 24 is provided from the input 28, intersecting bores 58, 60, and tapered roller bearing 48.

In use, when the clutch is disengaged as by release of hydraulic pressure on the piston 32, a return spring (not shown) interposed between the pressure plate 40 and back plate 42 seeks to urge separation of the interleaved disks 18, 20. In those instances where the viscosity of the fluid of the wet brake maintains undesired interengagement, with resultant rotation of the shaft 22, the brake assembly 24 serves to brake the shaft 22 and preclude such rotation. This is achieved by simultaneous actuation of the brake assembly 24, upon release of the piston 32. Application of hydraulic pressure to the input 30, and through the bore 80, develops a pressure head within the cavity 84 and a resultant force imparted by the piston 82 to the brake rotor 86 which is sandwiched between the rotor 82 and seal cover 92, both of which are affixed to the end cover 12. Accordingly, with the brake rotor 86 being splined to and rotatable with the shaft 22, braking of the shaft 22 is attained.

According to the invention, the brake 24 is incorporated into the end cover 12 between the tapered roller bearing 48 and the seal cover 92. Actuation of the piston 82 urges against the brake rotor 86 which is rotationally fixed to the seal ring 88, which is fixed to the shaft 22. The seal cover 92 is notched to the end cover 12 to restrain it for brake torque. Torque reaction tabs 94 serve to ground the seal cover 92 to the end cover 12. Accordingly, a highly functional cooled and lubricated shaft brake of compact structure is provided at an end of the end cover 12 and in operative engagement with the output shaft 22.

Thus it can be seen that the objects of the invention have been attained by the structure and operational techniques presented and described above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A fluid actuated clutch, comprising:
   a clutch housing;
   an output shaft extending from an end of said clutch housing;
   shaft support tapered roller bearings interposed between said output shaft and clutch housing in both axial and radial restraining engagement;
   a friction pack interposed between a back plate and pressure plate and operatively connected to said output shaft;
   a fluid actuated piston received by and operative within said clutch housing;
   a thrust bearing interposed between said piston and said pressure plate;

wherein reaction thrust loads from said back plate are restrained by said clutch housing through said output shaft and at least one of said shaft support tapered roller bearings; and wherein said tapered roller bearings have inner and outer races and wherein a first annular spacer ring is interposed between and positions the outer races of the tapered roller bearings, and a second annular spacer ring is interposed between and positions the inner races of the tapered roller bearings, said reaction thrust loads passing through a first tapered roller bearing, into said first annular spacer ring and through said outer race of said second tapered roller bearing to said clutch housing, and wherein said first tapered roller bearing engages a retaining shoulder of said output shaft, and said second tapered roller bearing engages a retaining shoulder of said clutch housing.

2. The fluid actuated clutch according to claim 1, wherein said first annular spacer ring has a lubrication groove in communication with a lubrication inlet, and said clutch housing provides a cavity receiving said first and second tapered roller bearings, said lubrication groove providing cooling oil to said cavity and said tapered roller bearings.

3. The fluid actuated clutch according to claim 1, wherein an annular spring is interposed between said clutch housing and said first tapered roller bearing.

4. The fluid actuated clutch according to claim 3, wherein said spring comprises a wave spring.

5. The fluid actuated clutch according to claim 1, wherein said thrust bearing is an angular contact bearing.

6. A fluid actuated clutch, comprising:
a clutch housing;
an output shaft extending from an end of said clutch housing;
shaft support tapered roller bearings interposed between said output shaft and clutch housing in both axial and radial restraining engagement;
a friction pack interposed between a back plate and pressure plate and operatively connected to said output shaft;
a fluid actuated piston received by and operative within said clutch housing;
a thrust bearing interposed between said piston and said pressure plate;
wherein reaction thrust loads from said back plate are restrained by said clutch housing through said output shaft and at least one of said shaft support tapered roller bearings; and
wherein said shaft support tapered roller bearings have inner and outer races and wherein a first annular spacer ring is interposed between and positions the outer races of the shaft support tapered roller bearings, and a second annular spacer ring is interposed between and positions the inner races of the shaft support tapered roller bearings, said first annular spacer ring having a lubrication groove in communication with a lubrication inlet, and said clutch housing providing a cavity receiving said shaft support tapered roller bearings, said lubrication groove providing cooling oil to said cavity and said shaft support tapered roller bearings, said cooling oil further passing to said thrust bearing and friction pack outside of said output shaft, said cooling oil passing between said output shaft and pressure plate to said friction pack.

7. The fluid actuated clutch according to claim 6, wherein said pressure plate is characterized by axial bores, said cooling oil passing from said thrust bearing, through said bores, and to said friction pack.

8. The fluid actuated clutch according to claim 7, further comprising an output hub joined to said output shaft, said output hub having passages receiving cooling oil from said pressure plate and passing said cooling oil to said friction stack.

* * * * *